United States Patent
Daschel

[19]

[11] Patent Number: 5,852,978
[45] Date of Patent: Dec. 29, 1998

[54] DEVICE FOR DISPLAYING A MOTOR VEHICLE AND METHODS FOR DISPLAYING A MOTOR VEHICLE

[76] Inventor: John P. Daschel, 4801 S. Coleman La., Spokane, Wash. 99223

[21] Appl. No.: 851,466

[22] Filed: May 5, 1997

[51] Int. Cl.$^6$ ..................................................... B60S 13/00
[52] U.S. Cl. ................................ 104/44; 104/46; 104/37
[58] Field of Search ................................ 104/35, 44, 45, 104/46, 74, 75, 76, 37; 108/22

[56] References Cited

U.S. PATENT DOCUMENTS

| | | | |
|---|---|---|---|
| D. 236,257 | 8/1975 | Ficke | D12/55 |
| 274,439 | 3/1883 | Clarke | 104/44 |
| 1,421,008 | 6/1922 | Inman | 104/38 |
| 1,449,767 | 3/1923 | MacLean | 104/44 |
| 1,472,792 | 11/1923 | Dodge et al. | 104/44 |
| 1,930,959 | 4/1933 | Potvin et al. | 254/87 |
| 3,369,498 | 2/1968 | O'Toole et al. | 104/44 |
| 3,420,187 | 1/1969 | Johnson et al. | 104/35 |
| 3,583,326 | 6/1971 | Poissant | 104/44 |
| 3,854,404 | 12/1974 | Janda | 104/44 |
| 4,020,767 | 5/1977 | Hardy | 104/44 |
| 4,498,398 | 2/1985 | Vallee | 104/44 |
| 4,609,111 | 9/1986 | Astill | 104/44 |
| 4,753,173 | 6/1988 | James | 104/45 |
| 4,841,870 | 6/1989 | Coles | 104/44 |
| 5,626,079 | 5/1997 | Summers | 104/44 |

OTHER PUBLICATIONS

"Anchor Turntables for Displays" Anchor Steel and Conveyor Company, no date.

*Primary Examiner*—Mark T. Le
*Attorney, Agent, or Firm*—Wells, St. John, Roberts, Gregory & Matkin, P.S.

[57] ABSTRACT

The invention includes devices for displaying motor vehicles and to methods for displaying motor vehicles. In one aspect, the invention includes a device for displaying a motor vehicle comprising: a) a platform configured for supporting an unoccupied motor vehicle; and b) the platform being further configured for rotation about a rotation axis and tilting about a tilt axis while supporting the unoccupied motor vehicle. In another aspect, the invention includes a device for displaying a motor vehicle comprising: a) a first support member defining a tilt axis; b) a second support member defining a rotation axis; c) a platform pivotally supported by the first and second support members and configured for supporting a motor vehicle, the platform being configured for tilting about the tilt axis and for rotating about the rotation axis; and d) a power source operationally attached to at least one of the first support member and the platform and configured for driving the tilting of the platform about the tilt axis. In yet another aspect, the invention includes a method for displaying a motor vehicle comprising: a) transporting the motor vehicle onto a platform; b) rotating the platform; and c) tilting the platform from an original position to a position angularly displaced by at least about 5° relative to the original position.

16 Claims, 5 Drawing Sheets

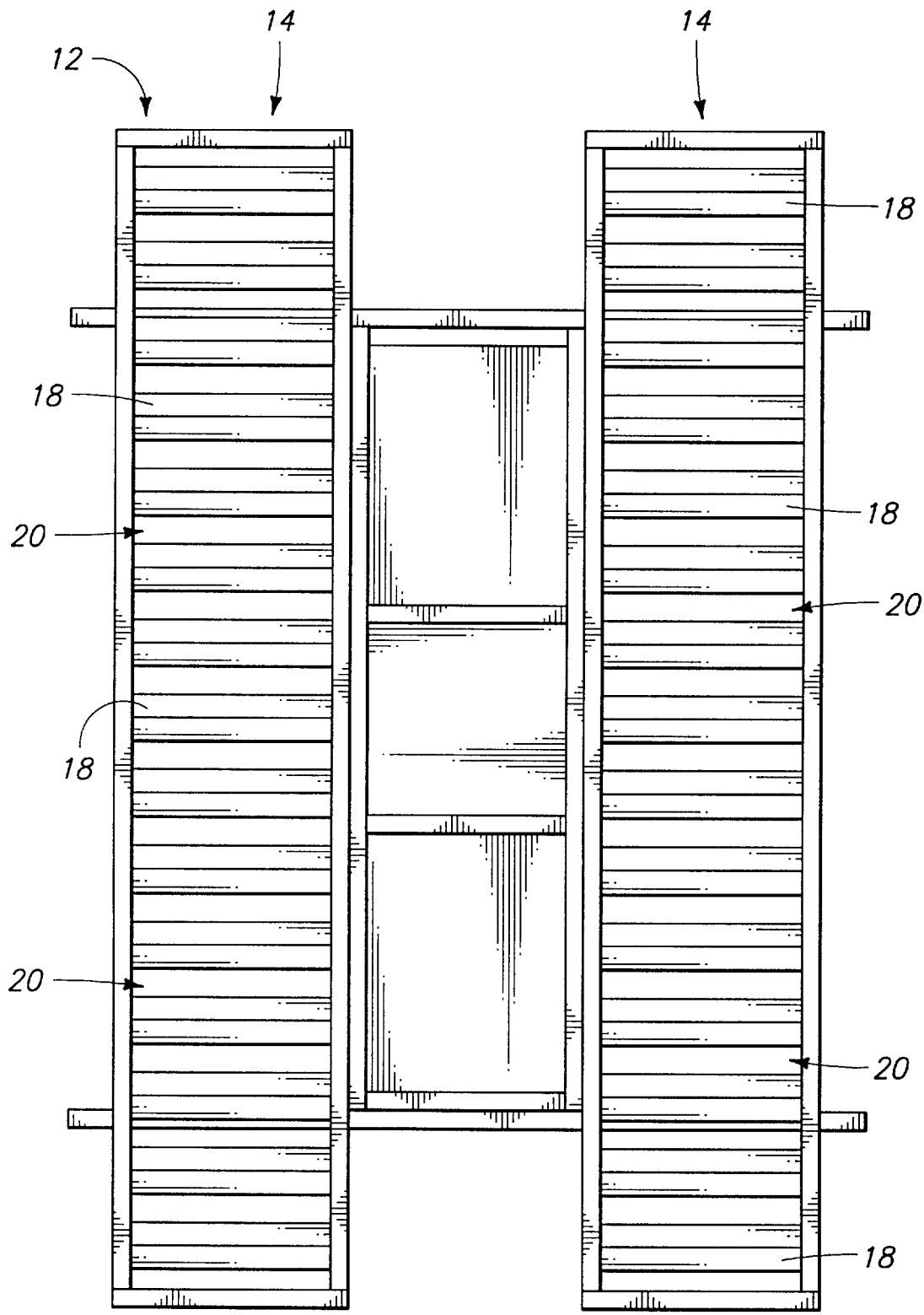

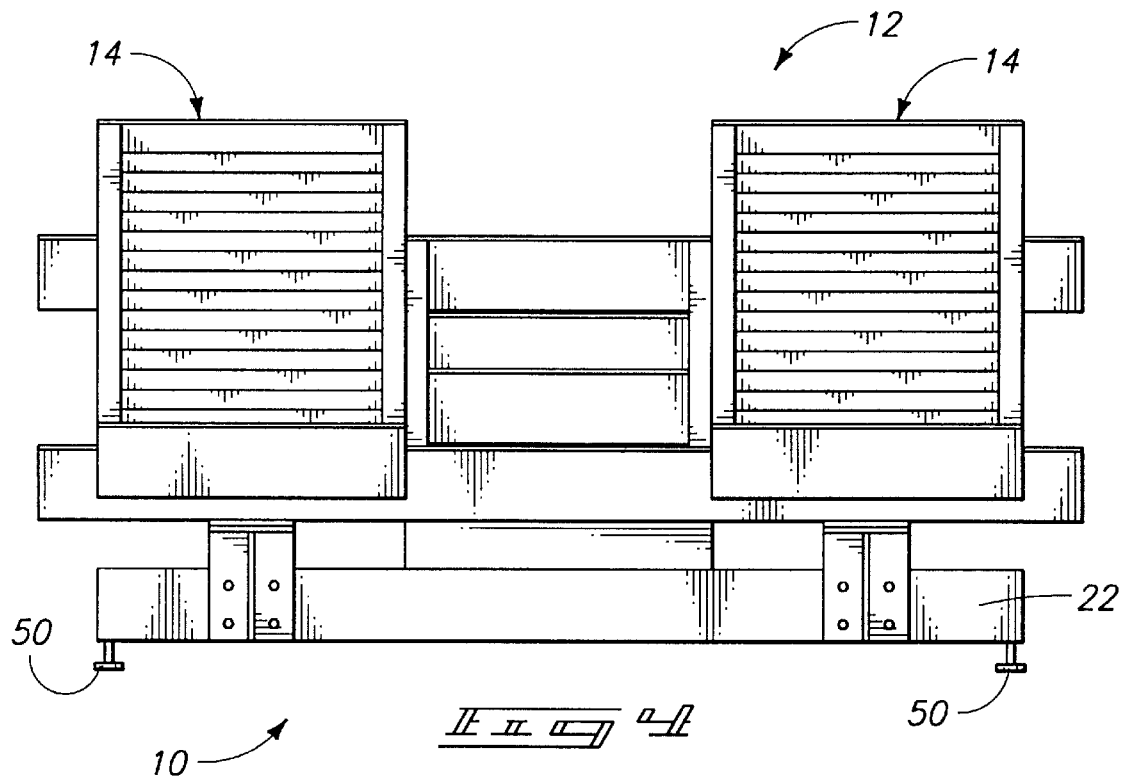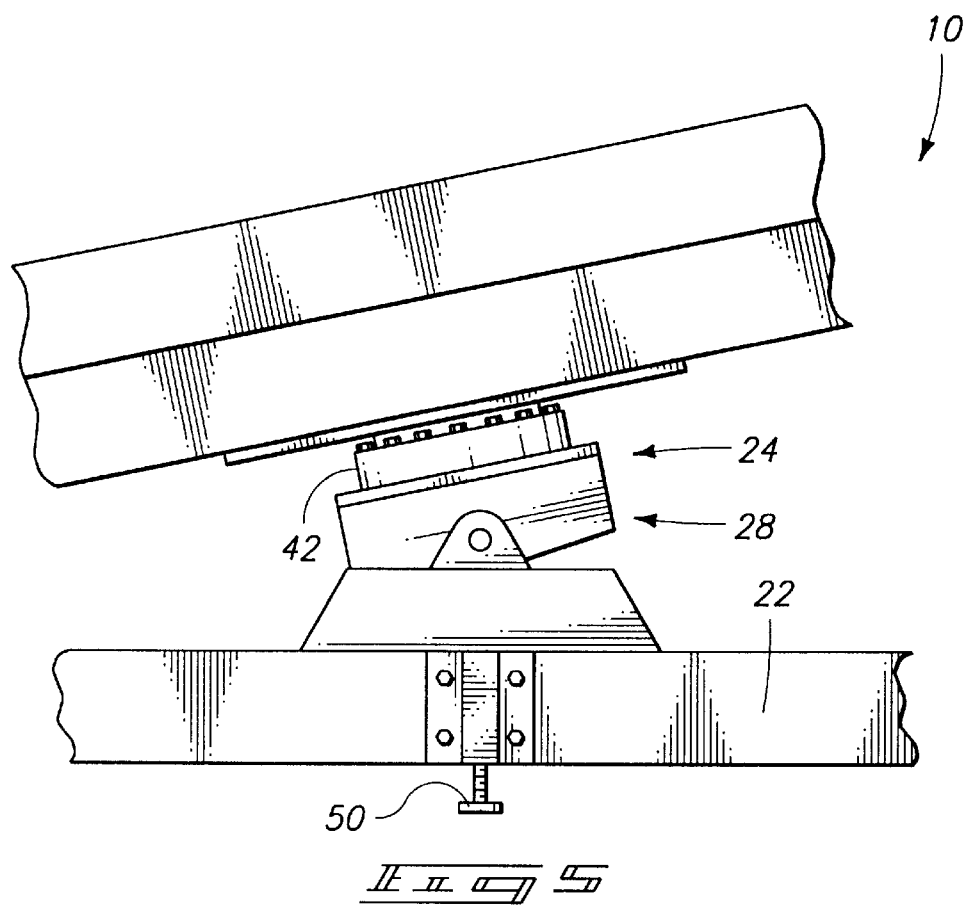

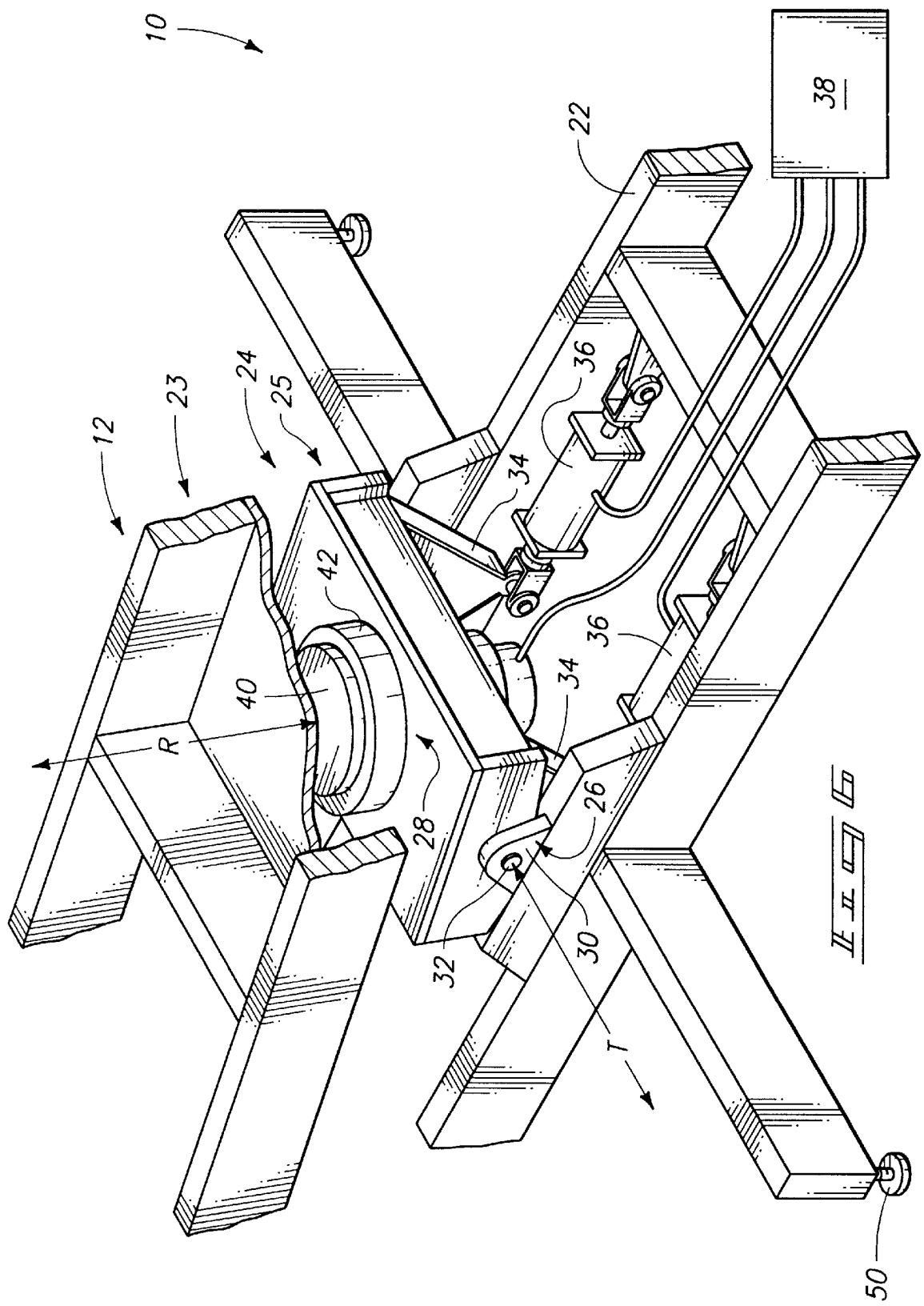

DEVICE FOR DISPLAYING A MOTOR VEHICLE AND METHODS FOR DISPLAYING A MOTOR VEHICLE

TECHNICAL FIELD

The invention pertains to devices for displaying motor vehicles and to methods for displaying motor vehicles.

BACKGROUND OF THE INVENTION

Motor vehicles are frequently displayed at vehicle distributorships and other places of business. The continuing goal in vehicle display is to create displays interesting to passersby. Ideally the displays will not only attract attention of passersby, but will also hold such attention for a substantial time period. Further, such displays will ideally direct attention toward a displayed vehicle, rather than toward a displaying apparatus.

Some displays have been manufactured which elevate vehicles above the ground in the hopes that such elevation of a vehicle will attract attention of persons passing by. One method for elevating a vehicle is to position the vehicle on a stationary ramp.

Although it has been found that elevation of the vehicles enhances visibility of the vehicle and can create interesting displays to initially obtain consumer attention, mere elevation of a vehicle will generally accomplish little more than to obtain momentary interest. The elevation of a vehicle will seldom hold a consumer's attention. As indicated above, an ideal display device should not only initially attract attention, but should also captivate the attention and optimally rivet consumers to the displayed device. Accordingly, there remains a need for better vehicle display devices.

The present invention addresses the need for better vehicle display devices. The present invention elevates a vehicle into an unnatural pose to initially attract consumer attention. Additionally, the present invention gyrates and undulates the displayed vehicle to maintain the consumer's interest. Further, the present invention displays the vehicle in a prominent elevated location and maintains a relatively low profile of the display device itself, thus focusing consumer attention on the displayed vehicle rather than on the display device.

BRIEF DESCRIPTION OF THE DRAWINGS

Preferred embodiments of the invention are described below with reference to the following accompanying drawings.

FIG. 3 is a top view of the vehicle display device of FIG. 1.

FIG. 4 is a front view of the vehicle display device of FIG. 1.

FIG. 5 is an exploded side view of the region labeled "5" in FIG. 2.

FIG. 6 is an exploded fragmentary perspective view of a portion of the FIG. 1 vehicle display device.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
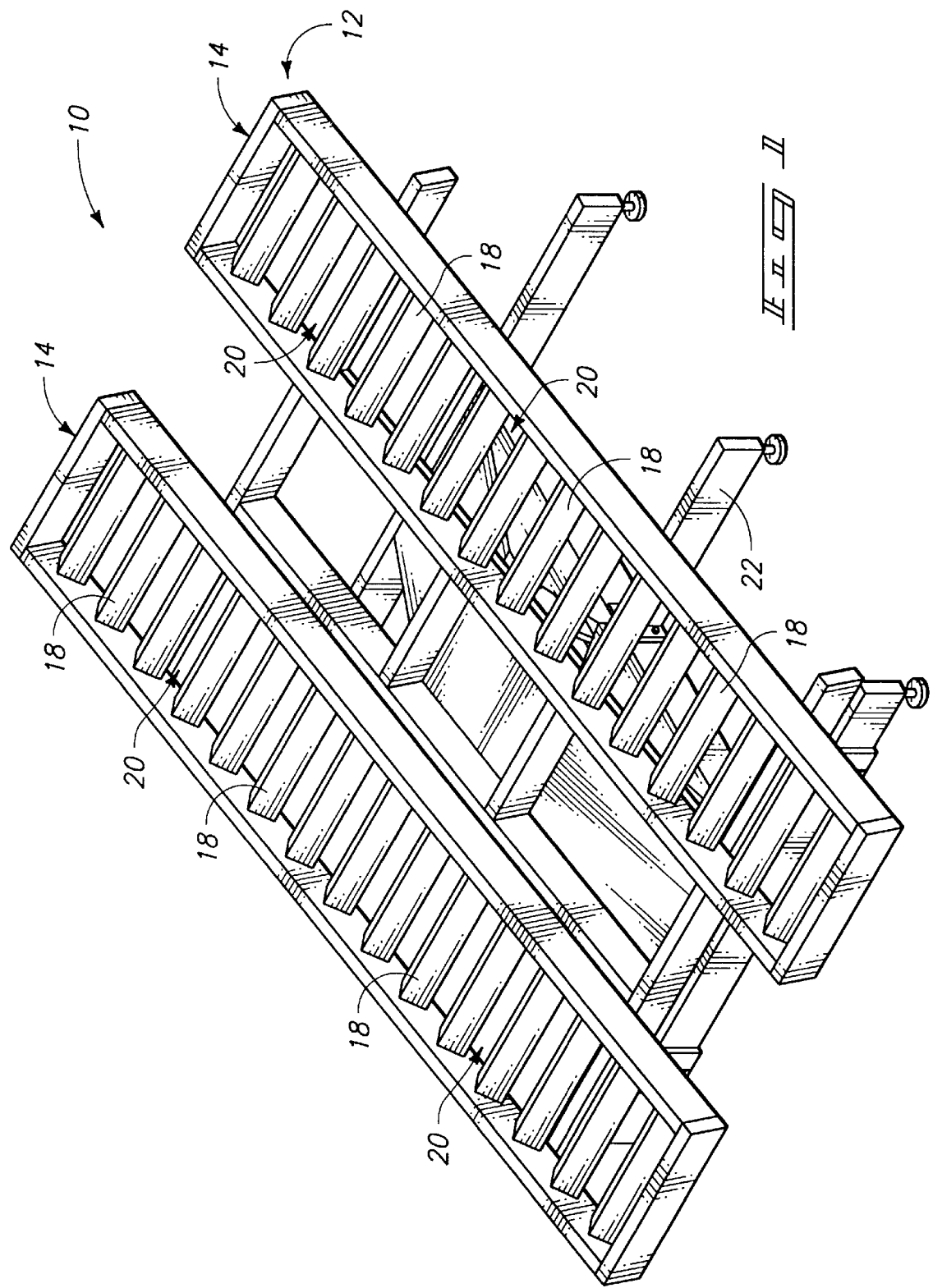
FIG. 1 is a perspective view of a vehicle display device of the present invention.
Figure 2:
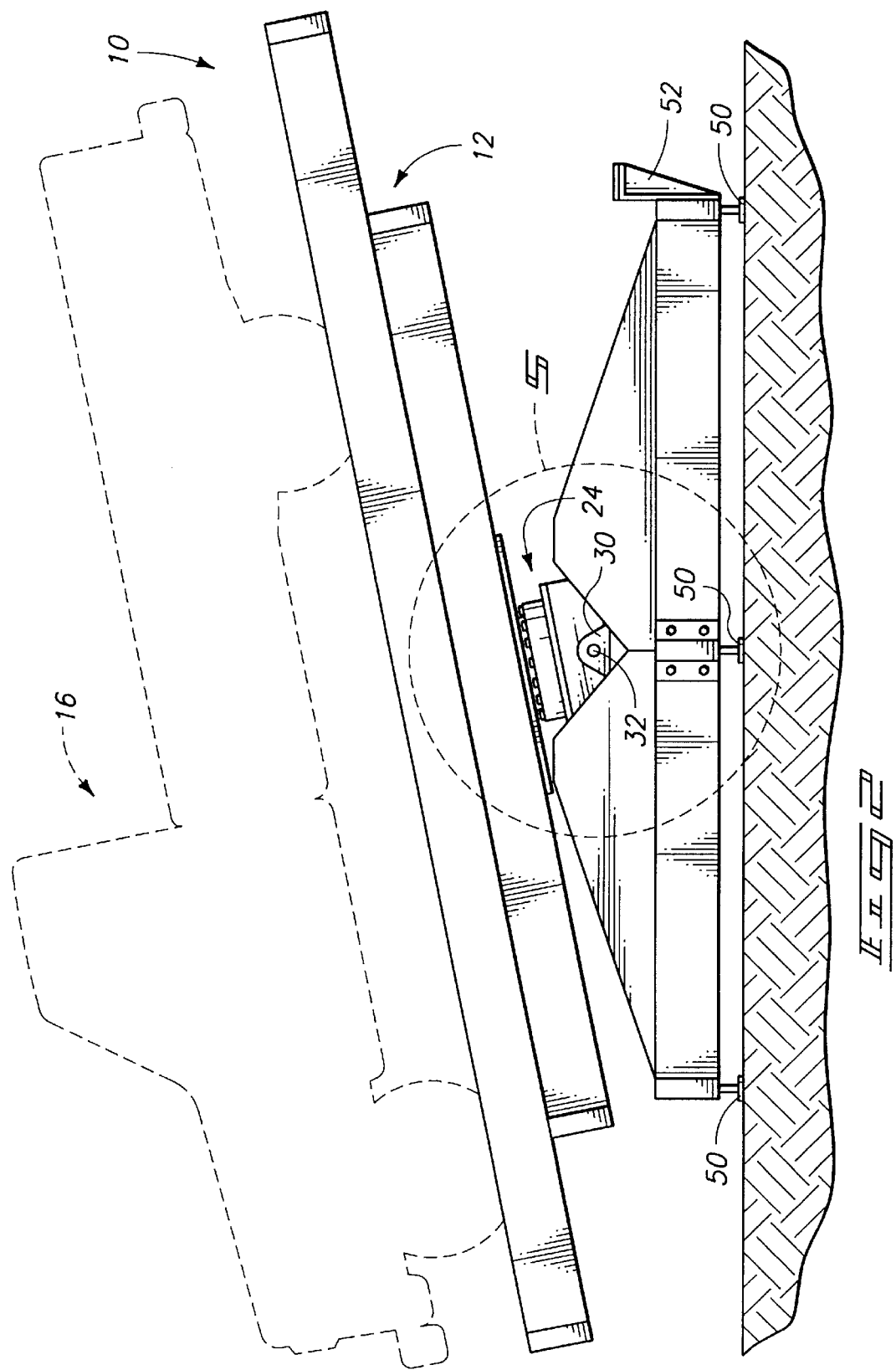
FIG. 2 is a side view of the vehicle display device of FIG. 1, shown elevating a motor vehicle.

A device 10 of the present invention is described below with reference to FIGS. 1–6. Device 10 comprises a platform 12 for supporting a motor vehicle. For purposes of interpreting the claims which follow, the term "platform" is broadly defined to encompass any structure upon which a vehicle may be supported. In the shown embodiment, platform 12 comprises a pair of channels 14 configured for retaining the wheels of a motor vehicle, such as the vehicle 16 shown in FIG. 2. Channels 14 comprise ridges 18 configured for gripping the wheels in a relatively non-slip configuration. Ridges 18 are separated by gaps 20.

Although device 10 is illustrated displaying a wheeled device, it will be recognized by persons of ordinary skill in the art that device 10 is also suitable for displaying non-wheeled devices, such as, for example, tracked vehicles.

Platform 12 is mounted to a base 22 through a tiltable and rotatable mount 24. Mount 24 comprises a first support member 26 defining a tilt axis "T" and a second support member 28 defining a rotation axis "R". Platform 12 is pivotally supported by first support member 26 and second support member 28 and is thereby configured for tilting about tilt axis "T" and rotating about rotation axis "R". In the shown embodiment, rotation axis "R" and tilt axis "T" intersect. However, as will be recognized by persons of ordinary skill in the art, alternative constructions of the present embodiment could be formed wherein rotation axis "R" and tilt axis "T" do not intersect.

A device of the present invention is preferably configured for rotation about axis "R" and tilting about axis "T" to occur simultaneously. In such preferred embodiments, a displayed vehicle 16 will move in an undulating, rotating manner. Such undulating, rotating motion can advantageously draw attention of passersby to the displayed vehicle. In alternate preferred embodiments, the device of the present invention is first tilted to a desired angle and subsequently rotated while being maintained at the desired angle. Although such embodiments do not produce an undulating motion, the embodiments still appear to attract and captivate the attention of persons passing by. The rotation of a vehicle at a tipped angle appears to create an optical effect wherein the vehicle has the impression of being whipped around a cam. Such optical effect can arouse the curiosity of persons passing by.

Platform 12 comprises a tiltable portion 25 above base 22. Tiltable portion 25 comprises a journal 32 and first support member 26 comprises a bearing 30. Journal 32 extends within bearing 30 and is configured to rotate within bearing 30. In the shown embodiment, journal 32 is shown as part of platform 12 and bearing 30 is shown as part of first support member 26. It is noted, however, that the relationship of the bearing and the journal could be reversed such that first support member 26 comprises the journal and platform 12 comprises the bearing.

Arms 34 extend from tiltable portion 25 of platform 12 and are configured to couple movement of arms 34 with tilting of platform 12. Arms 34 are connected to hydraulic rams 36, which are in turn connected to a power source 38. Power from power source 38 is transferred to rams 36 in the form of hydraulic pressure. Such power can be utilized to drive movement of arms 34 and to thereby tilt platform 12 about axis "T".

Platform 12 comprises a rotatable portion 23 above a second support member 28. Second support member 28 comprises a bearing 42 and rotatable portion 23 of platform 12 comprises a journal 40. Journal 40 extends within bearing 42 and is configured to rotate with bearing 42. As will be recognized by persons of ordinary skill in the art, the relationship of bearing 42 and journal 40 to second support member 28 and platform 12 could be reversed. Accordingly, platform 12 can comprise a bearing and second support member 28 can comprise a journal.

The journal and bearing arrangements described above regarding platform 12, first support member 26 and second support member 28 can encompass a number of different assemblies for enabling rotation of one portion of device 10 relative to another portion of device 10. For instance, the journal and bearing assembly of second support member 28 and rotatable portion 23 of platform 12 can encompass a turntable style ball bearing assembly.

Power source 38 is operably connected to journal 40 to rotate journal 40 within bearing 38. In preferred embodiments, power source 38 is substantially entirely contained beneath platform 12 to avoid undesired interactions of passersby with power source 38.

Base 22 comprises support pedestals 50 which are preferably adjustable and may be utilized for leveling base 22 on an uneven surface. Support pedestals 50 are preferably configured to impede slippage of device 10 on a surface. Base 22 further comprises stops 52 which catch platform 12 during tilting of platform 12 and permit platform 12 to rest upon base 22 in a tilted position during loading of a vehicle onto platform 12.

It is noted that base 22 could be configured to be mobile for transport to various locations by providing wheels beneath base 22 and a trailer tongue attached to base 22.

In preferred embodiments, device 10 is configured such that platform 12 may be tilted from an original position to a position angularly displaced from the original position by at least five degrees (5°) relative to the original position. More preferably, the platform is configured to tilt from the original position to a position angularly displaced by at least ten degrees (10°) relative to the original position. In other alternative embodiments, platform 12 can be configured to be angularly displaced by at least twenty degrees (20°) relative to the original position, and in yet other alternative embodiments can be configured to be angularly displaced by at least thirty degrees (30°) relative to an original position.

In operation, a vehicle 16 may be loaded onto platform 12 by tilting platform 12 to rest upon stops 52 and providing a supplemental ramp provided adjacent platform 12 for enabling a vehicle to be driven onto platform 12. In yet other alternative embodiments, vehicle 16 may be hoisted onto platform 12 with, for example, a crane.

After a vehicle is transported onto platform 12, the vehicle may be left unoccupied on platform 12. The unoccupied vehicle can then be rotated and tilted while on platform 12. The rotation and tilting can occur simultaneously or sequentially. Either way, the combination of tilting and rotating of platform 12 causes the unoccupied vehicle to bob and weave. Such bobbing and weaving of a displayed vehicle can be effective for attracting and holding consumer attention.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A device for displaying a motor vehicle, comprising:
   a platform sized to support a motor vehicle thereon;
   a pedestal underlying and supporting the platform and any motor vehicle on the platform;
   a support base underlying and supporting the pedestal, the pedestal being connected to the support base by one or more pins;
   at least one power source configured to tilt the pedestal about the pins, the pins defining a tilt axis about which the pedestal tilts;
   a rotatable connection between the platform and the support base, the rotatable connection defining a rotation axis of the platform relative to the support base, the rotation axis being perpendicular to the tilt axis, the at least one power source being further configured to rotate the platform with the rotatable connection and about the rotation axis; and
   wherein said device is configured to hold said platform fixed at an inclined angle as the platform being rotated about said rotation axis, or to move said platform in an undulating rotating manner.

2. The device of claim 1 wherein the pedestal extends substantially vertically and the pins extend substantially horizontally.

3. The device of claim 1 wherein the rotatable connection comprises a bearing and journal assembly joining the platform to the pedestal.

4. The device of claim 1 wherein the pedestal extends substantially vertically and further comprising a horizontally displaced actuator for tilting the pedestal, the actuator being coupled between the power source and the pedestal, the actuator being configured such that horizontal displacement of the actuator tilts the pedestal relative to the support base.

5. A device for displaying a motor vehicle, comprising:
   a platform sized to support a motor vehicle thereon, the platform comprising an outer periphery, the outer periphery having opposing first and second sides, the second side being across the platform from the first side;
   a support structure supporting a weight of the platform and any motor vehicle on the platform, the support structure comprising a pedestal underlying the platform and located approximately midway between the first side and the second side, the pedestal being tiltable and rotatable about a tilt axis and a rotation axis, respectively;
   a power source connected with the pedestal and configured to tilt and rotate the pedestal while the pedestal supports the platform; and
   wherein said device is configured to hold said platform fixed at an inclined angle as the platform being rotated about said rotation axis, or to move said platform in an undulating rotating manner.

6. The device of claim 5 wherein the platform comprises a substantially rectangular-shaped outer periphery, the rectangular periphery comprising opposing sides and opposing ends, the first and second sides being the opposing sides of the outer periphery, the pedestal further being located approximately midway between the opposing ends.

7. The device of claim 5 wherein the support structure comprises only one pedestal supporting the weight of the platform.

8. A device for displaying a motor vehicle, comprising:
   a platform sized to support a motor vehicle thereon, the platform comprising an outer periphery, the outer periphery having opposing first and second sides, the second side being across the platform from the first side;

a pedestal underlying the platform and supporting a weight of the platform and any motor vehicle on the platform, the pedestal being located approximately midway between the first side and the second side, the pedestal being tiltable and rotatable;

a support base underlying and supporting the pedestal, the pedestal being connected to the support base by one or more pins;

at least one power source configured to tilt the pedestal about the pins, the pins defining a tilt axis about which the pedestal tilts;

a rotatable connection between the platform and the support base, the rotatable connection defining a rotation axis of the platform relative to the support base, the rotation axis being perpendicular to the tilt axis, the at least one power source being further configured to rotate the platform with the rotatable connection and about the rotation axis; and wherein said device is configured to hold said platform fixed at an inclined angle as the platform being rotated about said rotation axis, or to move said platform in an undulating rotating manner.

9. The device of claim 8 wherein the platform comprises a substantially rectangular-shaped outer periphery, the rectangular outer periphery comprising opposing sides and opposing ends, the first and second sides being the opposing sides of the outer periphery, the pedestal further being located approximately midway between the opposing ends.

10. The device of claim 8 wherein the support structure comprises only one pedestal supporting the weight of the platform.

11. The device of claim 8 being further configured for the rotating and the tilting to occur simultaneously.

12. The device of claim 8 wherein the pedestal extends substantially vertically and the pins extend substantially horizontally.

13. The device of claim 8 wherein the rotatable connection comprises a bearing and journal assembly joining the platform to the pedestal.

14. The device of claim 8 wherein the pedestal extends substantially vertically and further comprising a horizontally displaced actuator for tilting the pedestal, the actuator being coupled between the power source and the pedestal, the actuator being configured such that horizontal displacement of the actuator tilts the pedestal relative to the support base.

15. A device for displaying a motor vehicle, comprising:

a platform sized to support a motor vehicle thereon;

a pedestal underlying the platform and supporting a weight of the platform and any motor vehicle on the platform, the pedestal being configured to tilt about a tilt axis and being mounted at a center of the platform;

a support base underlying and supporting the pedestal;

at least one power source configured to tilt the pedestal about the tilt axis;

a rotatable connection between the platform and the support base, the rotatable connection defining a rotation axis of the platform relative to the support base, the rotation axis being perpendicular to the tilt axis, the at least one power source being further configured to rotate the platform with the rotatable connection and about the rotation axis; and wherein said device is configured to hold said platform fixed at an inclined angle as the platform being rotated about said rotation axis, or to move said platform in an undulating rotating manner.

16. The device of claim 15 wherein the pedestal is a separate piece from the support structure.

* * * * *